(12) United States Patent
Hartshorn et al.

(10) Patent No.: US 8,342,444 B2
(45) Date of Patent: Jan. 1, 2013

(54) FAIL SAFE EXTENDED TORQUE BOX STRUT-TO-WING MOUNT

(75) Inventors: Scott Hartshorn, Everett, WA (US); Dean Leon Parham, Issaquah, WA (US); Donald T. Powell, Everett, WA (US)

(73) Assignee: The Boeing Company, Chicago, IL (US)

( * ) Notice: Subject to any disclaimer, the term of this patent is extended or adjusted under 35 U.S.C. 154(b) by 798 days.

(21) Appl. No.: 12/336,213

(22) Filed: Dec. 16, 2008

(65) Prior Publication Data
US 2010/0147996 A1 Jun. 17, 2010

(51) Int. Cl.
*B64D 27/00* (2006.01)
*F02C 7/20* (2006.01)
(52) U.S. Cl. .................. 244/54; 60/796; 248/554
(58) Field of Classification Search .............. 244/54; 60/796–797; 248/554–557
See application file for complete search history.

(56) References Cited

U.S. PATENT DOCUMENTS

| | | | |
|---|---|---|---|
| 4,437,627 A | 3/1984 | Moorehead | |
| 4,997,145 A * | 3/1991 | Hodgkinson | 244/54 |
| 5,054,715 A | 10/1991 | Hager et al. | |
| 5,275,357 A * | 1/1994 | Seelen et al. | 244/54 |
| 5,620,154 A * | 4/1997 | Hey | 244/54 |
| 5,649,417 A * | 7/1997 | Hey | 244/54 |
| 5,860,623 A * | 1/1999 | Dunstan et al. | 244/54 |
| 5,927,644 A * | 7/1999 | Ellis et al. | 244/54 |
| 6,095,456 A * | 8/2000 | Powell | 244/54 |
| 7,083,143 B2 | 8/2006 | Whitmer et al. | |
| 7,104,306 B2 * | 9/2006 | Huggins et al. | 244/54 |
| 7,121,504 B2 | 10/2006 | Machado et al. | |
| 7,350,747 B2 | 4/2008 | Machado et al. | |
| 7,438,262 B2 * | 10/2008 | Chamberlain | 244/54 |
| 7,789,343 B2 | 9/2010 | Sarh et al. | |
| 7,963,479 B2 * | 6/2011 | Cazals | 244/54 |
| 7,997,527 B2 | 8/2011 | Lafont | |
| 2005/0082423 A1* | 4/2005 | Whitmer et al. | 244/54 |
| 2006/0231679 A1* | 10/2006 | Chamberlain | 244/54 |
| 2008/0217502 A1* | 9/2008 | Lafont | 248/554 |
| 2009/0108127 A1* | 4/2009 | Cazals | 244/54 |

* cited by examiner

*Primary Examiner* — Christopher P Ellis
*Assistant Examiner* — Steven Hawk
(74) *Attorney, Agent, or Firm* — Yee & Associates, P.C.

(57) ABSTRACT

An apparatus for mounting an aircraft engine to a wing includes a torque box strut for supporting the engine and a mounting system for attaching the torque box strut to the wing. The mounting system has an aft mounting system for attaching the torque box strut to the wing and that has at least one active aft link for attaching the torque box strut to the wing during normal aircraft operation, and at least one aft link catcher for attaching the torque box strut to the wing upon a failure of one of the at least one active aft link. The mounting system has a forward mounting system for attaching the torque box strut to the wing and that has at least one active forward link for attaching the torque box strut to the wing during normal aircraft operation, and at least one forward link catcher for attaching the torque box strut to the wing upon a failure of one of the at least one active forward link.

21 Claims, 11 Drawing Sheets

FAIL SAFE EXTENDED TORQUE BOX STRUT-TO-WING MOUNT

BACKGROUND INFORMATION

1. Field

The present disclosure relates generally to a method and apparatus for mounting an aircraft engine to a wing of an aircraft. More particularly, the present disclosure relates to a method and apparatus for attaching a torque box strut to a wing of an aircraft.

2. Background

A torque box strut is a structure used to mount an aircraft engine to a wing of an aircraft. A known apparatus for attaching a torque box strut to the wing uses six strut-to-wing attachments, all of which are active under normal flight conditions. If one of the connections were to fail, the remaining five are sufficient to constrain the engine in all six degrees of freedom.

It is desirable that the torque box strut be made as narrow as possible so as to reduce drag and increase aerodynamic efficiency. There are, however, structural limitations on how narrow a torque box strut can be made. In known torque box strut designs, for example, there are five attachment points to the wing at the aft end of the torque box strut, including two redundant links. If the torque box strut is made too narrow, there will not be sufficient space to react to the required load. In known torque box strut designs also, another link, known as the "upper link", tends to carry an excessive load. In a condition where the upper link fails, the other attachments become loaded beyond their intact loading conditions and must be sized accordingly to ensure safety.

Torque box struts having an extension of the aft mount have been proposed. Although such "extended torque box struts" tend to be more aerodynamically efficient and less structurally redundant than conventional strut designs, they have not been implemented because they do not provide satisfactory fail safe solutions.

Therefore, it would be advantageous to have a method and apparatus that overcomes the above issues in mounting an aircraft engine to a wing of an aircraft.

SUMMARY

In one advantageous embodiment of the present disclosure, an apparatus for mounting an aircraft engine to a wing comprises a torque box strut for supporting the aircraft engine, and a strut-to-wing mounting system for attaching the torque box strut to the wing of an aircraft. The strut-to-wing mounting system has an aft mounting system for attaching the torque box strut to the wing. The aft mounting system has at least one active aft link for attaching the torque box strut to the wing during normal aircraft operation, and at least one aft link catcher for attaching the torque box strut to the wing upon a failure of one of the at least one active aft link. The strut-to-wing mounting system also has a forward mounting system for attaching the torque box strut to the wing. The forward mounting system has at least one active forward link for attaching the torque box strut to the wing during normal aircraft operation, and at least one forward link catcher for attaching the torque box strut to the wing upon a failure of one of the at least one active forward link.

In a further advantageous embodiment of the present disclosure, a method for mounting an aircraft engine to a wing of an aircraft, wherein the aircraft engine is supported by a torque box strut and wherein the torque box strut is attached to the wing of the aircraft, includes attaching the torque box strut to the wing by at least one active aft link during normal aircraft operation, and attaching the torque box strut to the wing by least one aft link catcher upon a failure of one of the at least one active aft link. The method further includes attaching the torque box strut to the wing by at least one active forward link during normal aircraft operation, and attaching the torque box strut to the wing by at least one forward link catcher upon a failure of the at least one active forward link.

In yet a further advantageous embodiment of the present disclosure, an apparatus for mounting an aircraft engine to a wing of an aircraft includes a torque box strut for supporting the aircraft engine. The apparatus also includes a strut-to-wing mounting system for attaching the torque box strut to the wing of an aircraft. The strut-to-wing mounting system has an aft mounting system for attaching the torque box strut to the wing at an aft end of the strut, the aft mounting system comprising first and second active aft links for attaching the torque box strut to the wing to constrain side and vertical load forces during normal aircraft operation, and first and second aft link catchers for attaching the torque box strut to the wing to constrain the side and vertical load forces upon a failure of one of the first and second active aft links. The first and second aft link catchers do not attach the torque box strut to the wing during the normal aircraft operation. The strut-to-wing mounting system also has a forward mounting system for attaching the torque box strut to the wing at a position on the strut that is forward of the aft end, the forward mounting system comprising first and second active forward links for attaching the torque box strut to the wing for constraining vertical load forces and roll moment during the normal aircraft operation, and a forward link catcher for attaching the torque box strut to the wing upon a failure of either the first or the second active forward link for constraining the vertical load forces and the roll moment. The forward link catcher does not attach the torque box strut to the wing during the normal aircraft operation. The strut-to-wing mounting system also has a thrust puck system, the thrust puck system having an active thrust puck for constraining thrust and side load forces during normal aircraft operation, and a catcher thrust puck for constraining the thrust and side load forces upon a failure of the active thrust puck. The catcher thrust puck is inactive during the normal aircraft operation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
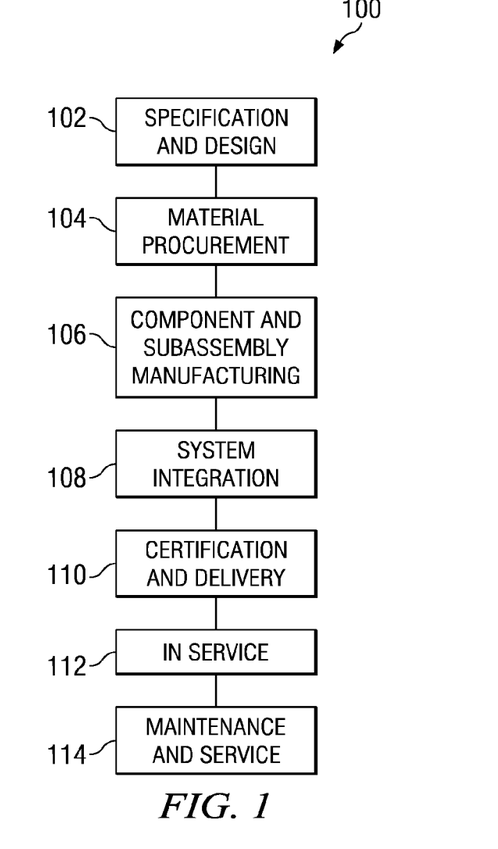
FIG. 1 is a diagram illustrating an aircraft manufacturing and service method in which an advantageous embodiment may be implemented.
Figure 2:
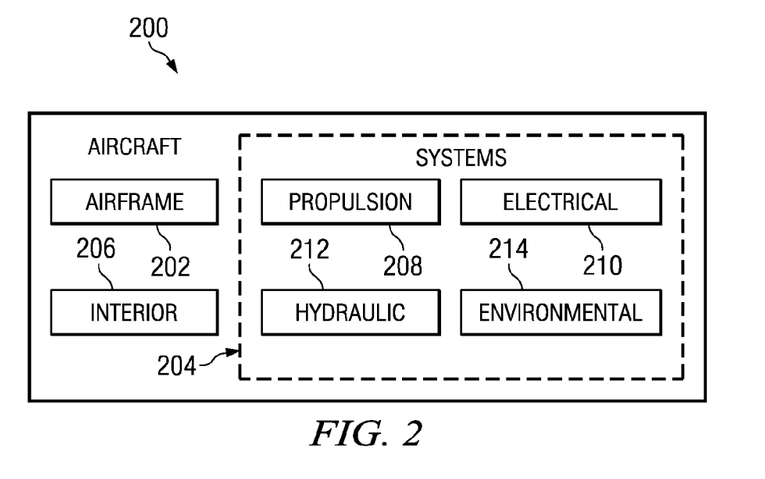
FIG. 2 is a diagram illustrating an aircraft in accordance with an advantageous embodiment.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is subject to maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major system subcontractors; a third party may include, for example and without limitation, any number of vendors, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example and without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example and without limitation, by substantially expediting assembly of or reducing the cost of aircraft 200.

Similarly, one or more of apparatus embodiments, method embodiments, or a combination thereof may be utilized while aircraft 200 is in service, for example and without limitation, during maintenance and service 114. As a specific example, an advantageous embodiment may be implemented during maintenance and service 114 to repair an aircraft component formed of composite material.

Figure 3:
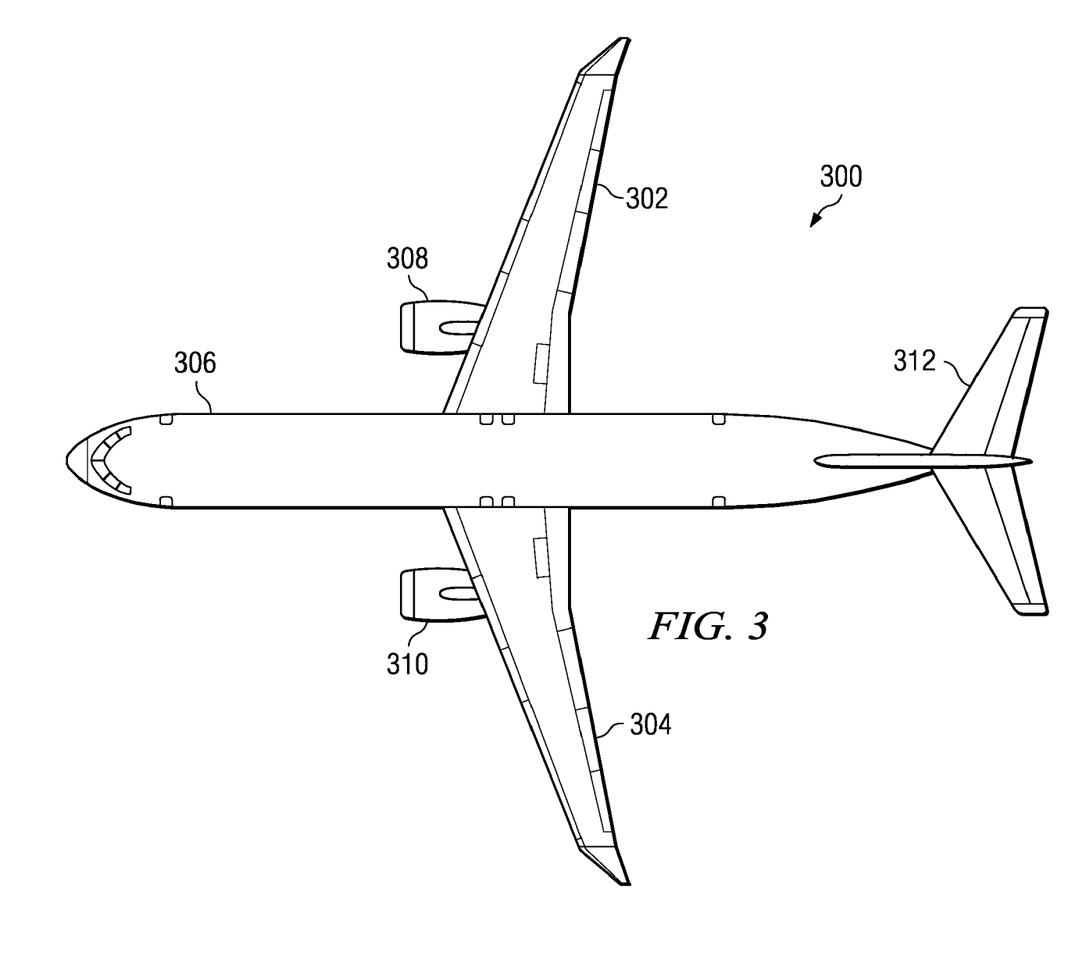
FIG. 3 illustrates an example of an aircraft in which advantageous embodiments may be implemented.

FIG. 3 illustrates an example of an aircraft in which advantageous embodiments may be implemented. Aircraft 300 can be implemented as aircraft 200 in FIG. 2, and is an example of an aircraft in which methods and apparatus for mounting an aircraft engine to a wing of an aircraft in accordance with advantageous embodiments may be implemented. In this illustrative example, aircraft 300 has wings 302 and 304 attached to body 306. Aircraft 300 includes wing mounted engine 308, wing mounted engine 310 and tail 312.

Figure 4:
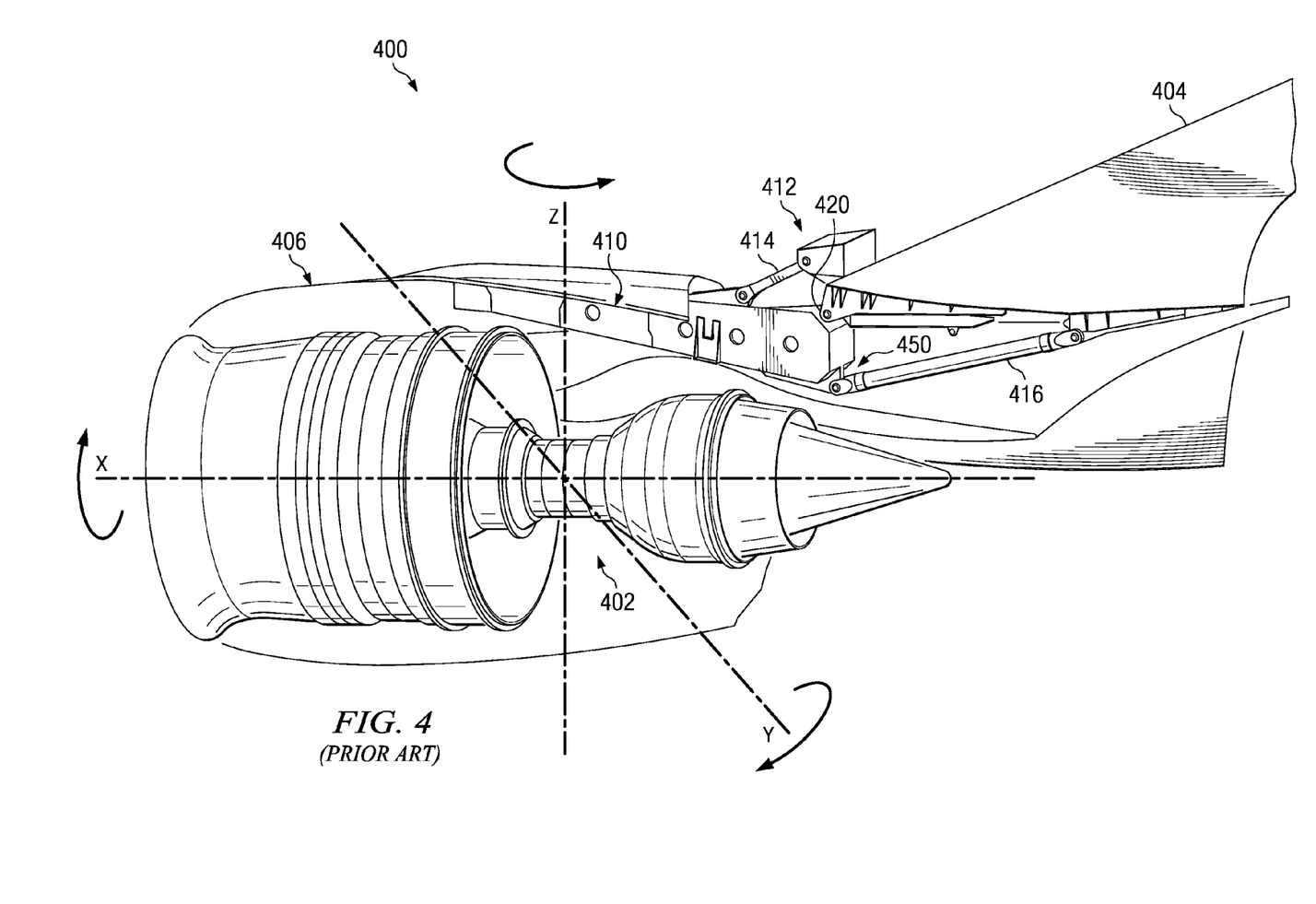
FIG. 4 is a diagram, partially in cross-section, illustrating a known apparatus for mounting an aircraft engine to a wing of an aircraft to assist in explaining advantageous embodiments.

FIG. 4 is a diagram, partially in cross-section, illustrating a known apparatus for mounting an aircraft engine to a wing of an aircraft to assist in explaining advantageous embodiments. The mounting apparatus is generally designated by reference number 400, and mounts aircraft engine 402 to wing 404 of an aircraft. Aircraft engine 402 may be implemented as one of aircraft engines 308 or 310 in FIG. 3; and aircraft wing 404 may be implemented as one of wings 302 or 304 in FIG. 3.

Mounting apparatus 400 includes a torque box strut 410, sometimes referred to herein as a "strut box" or, simply, as a "strut." Torque box strut 410 is attached to both casing 406 of engine 402 and to wing 404 and attaches the engine to the wing. In particular, torque box strut 410 is attached to wing 404 by a plurality of strut-to-wing attachments, generally designated by reference number 412. The known mounting apparatus 400 illustrated in FIG. 4 includes six strut-to-wing attachments, two of which are illustrated in FIG. 4. The illustrated attachments include upper link 414 and diagonal brace 416. Also illustrated in FIG. 4 is one fitting 420 of a pair of fittings that are pinned to wing 404.

Figure 5:
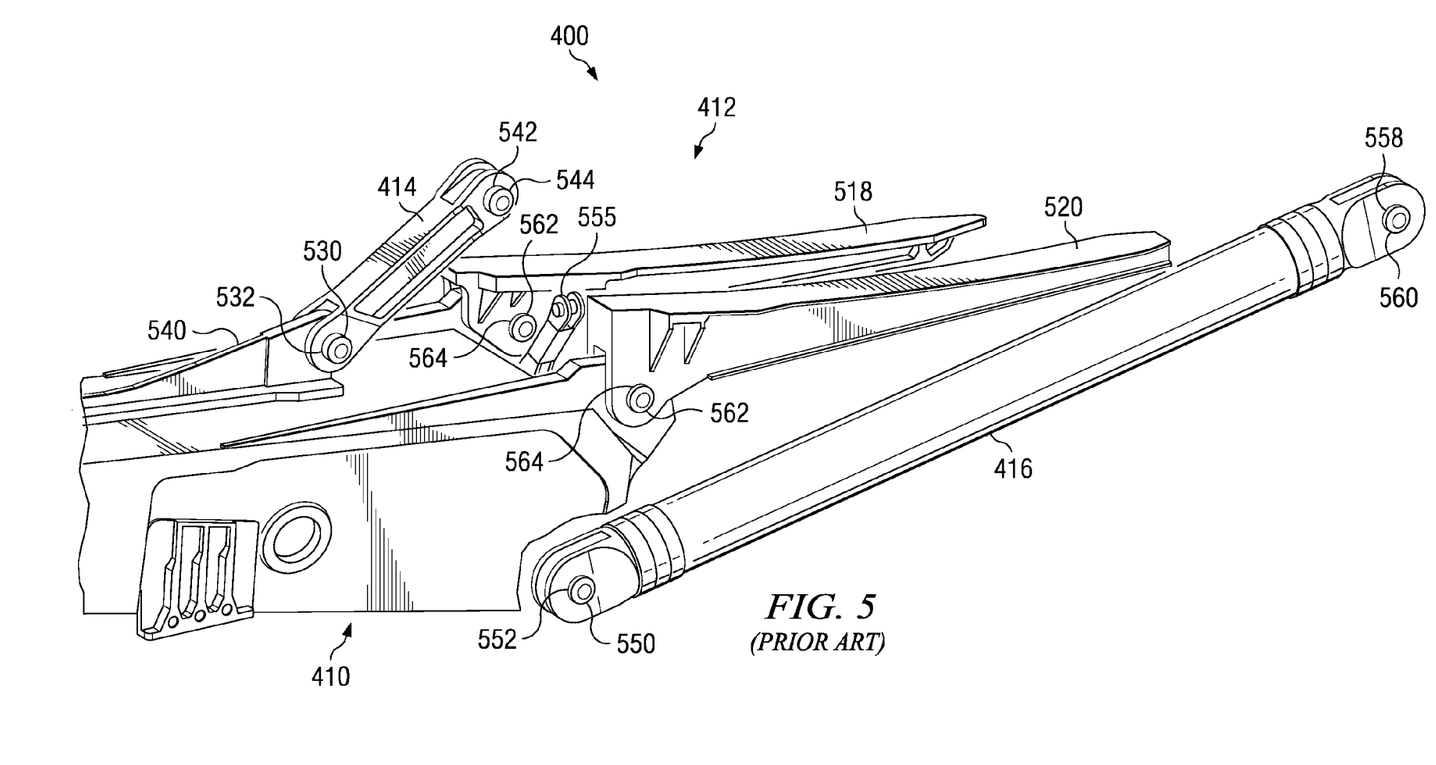
FIG. 5 is a diagram illustrating a side perspective view of a portion of the known mounting apparatus of FIG. 4.
Figure 6:
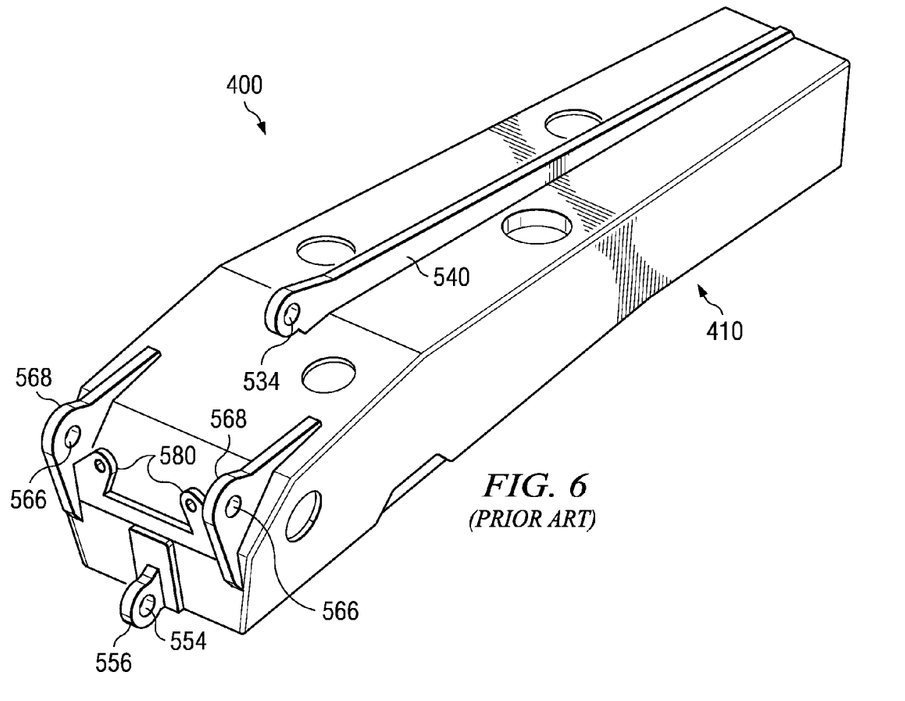
FIG. 6 is a diagram illustrating a rear perspective view of the known mounting apparatus of FIGS. 4 and 5 with strut-to-wing attachments removed.

FIG. 5 is a diagram illustrating a side perspective view of a portion of the known mounting apparatus of FIG. 4. FIG. 6 is a diagram illustrating a rear perspective view of the known mounting apparatus of FIGS. 4 and 5 with strut-to-wing attachments removed. As shown in FIG. 5, mounting apparatus 400 includes torque box strut 410, and a plurality of six strut-to-wing attachments 412 for attaching the torque box strut to a wing of an aircraft, for example, to wing 404 in FIG. 4.

The six strut-to-wing attachments 412 include upper link 414 and diagonal brace 416 as are also illustrated in FIG. 4.

With reference to FIGS. 5 and 6, upper link 414 is attached to torque box strut 410 by fuse pin 530 extended through aligned holes 532 and 534 at the lower end of the upper link and in an upper fitting 540 attached to an upper surface of the strut, respectively. Upper link 414 also includes a hole 542 at its upper end for receiving a secondary pin 544 for attaching the upper link to the front spar of the wing of the aircraft (not shown).

Diagonal brace 416 is attached to torque box strut 410 by secondary pin 550 extended through aligned holes 552 and 554 at a lower end of diagonal brace 416 and in an aft fitting 556 attached to torque box strut 410 at the lower aft end thereof. Diagonal brace 416 also includes a hole 558 at an upper end thereof for receiving a fuse pin 560 for attachment to the aircraft wing (not shown). Diagonal brace 416 runs from the lower aft end of strut 410 and shears diagonally into the wing skin.

Also shown in FIGS. 5 and 6 is a pair of opposed fittings 568 on torque box strut 410. Opposed fittings 568 attach wing-mounted fittings 518 and 520 to the torque box strut by fuse pins 562 extended through aligned holes 564 and 566 in wing-mounted fittings 518 and 520 and in opposed fittings 568, respectively.

As shown in FIG. 6, pair of sidelink fittings 580 is also attached to the aft end of strut 410 for attaching a pair of sidelinks to the aircraft wing. A portion of one of the pair of sidelinks is illustrated at 555 in FIG. 5.

In the known apparatus for mounting an aircraft engine to a wing of an aircraft illustrated in FIGS. 4-6, upper link 414 is attached to torque box strut 410 at a position fairly far forward on the strut, while the remaining five links are attached at the aft end of the strut, generally above an aft mount of the strut to the engine. As indicated by arrow 450 in FIG. 4, the known torque box strut ends near the leading edge of the wing.

In the known mounting apparatus illustrated in FIGS. 4-6, all six strut-to-wing attachments are active during normal flight (i.e., all six attachments connect the torque box strut to the wing and function together to support the engine attached to the torque box strut) and constrain all six degrees of freedom of the engine (i.e., constrain movement of the engine along the x, y, and z axes illustrated in FIG. 4, and rotation around each of the three axes). The six strut-to-wing attachments however, include some redundancy such that if one of the links were to fail, the other five links are sufficient to constrain all six degrees of freedom and to carry the weight of the engine. In such a situation, however, the other five links may be loaded beyond their intact loading condition, and, as a result, they must be sized accordingly.

For aerodynamic purposes, it is desirable that a torque box strut be made as narrow as possible. The known mounting apparatus illustrated in FIGS. 4-6, however, is limited with respect to how narrow the strut box may be made, due, in part, to the five attachment points provided at the aft end of the strut. If the strut box is made too narrow, there will not be sufficient space to react to the desired load.

Extended torque box struts have been proposed to enable the strut box to be made narrower. Generally, these extended designs utilize four or five strut-to-wing attachment points which are statically determinant for normal flight conditions. An extended torque box strut offers an increased moment arm for some of the loads which helps minimize the loads that are transmitted into the wing. If the strut-to-wing attachments are laid out properly, an extended torque box strut can be made narrower than conventional torque box struts, such as torque box strut 410 illustrated in FIGS. 4-6, thus providing an aerodynamic benefit.

Proposed extended torque box strut designs are disadvantaged, however, in their fail safe mechanisms. Also, the proposed designs typically use back-to-back fittings or pin-in-pin fittings to ensure redundancy, and this type of redundant structure is difficult to inspect on an aircraft.

In accordance with advantageous embodiments, a method and apparatus for mounting an aircraft engine to a wing of an aircraft is provided that avoids the use of redundant active strut-to-wing attachments or back-to-back attachments as are typically used in known torque box strut or extended torque box strut designs. Instead, advantageous embodiments provide a mounting apparatus that includes a "catcher" system that is statically determinant during normal flight conditions ("statically determinant" means that the load paths are independent of the stiffness of the catcher system). If, however, a structure of the mounting apparatus should fail, another structure will immediately move into position to connect the torque box strut to the wing and constrain any degree of freedom that was freed by the failure. As a result, the mounting apparatus in accordance with advantageous embodiments remains statically determinant during every failure condition of the mounting apparatus. This means that there is no "load fighting" between the strut-to-wing attachments resulting in lower overall pin and interface loads.

In accordance with advantageous embodiments, the mounting apparatus may effectively utilize an extended torque box strut enabling the torque box strut to be narrowed. This is because the side load path is not between two vertical fittings as, for example, in the known mounting apparatus illustrated in FIGS. 4-6.

Figure 7:
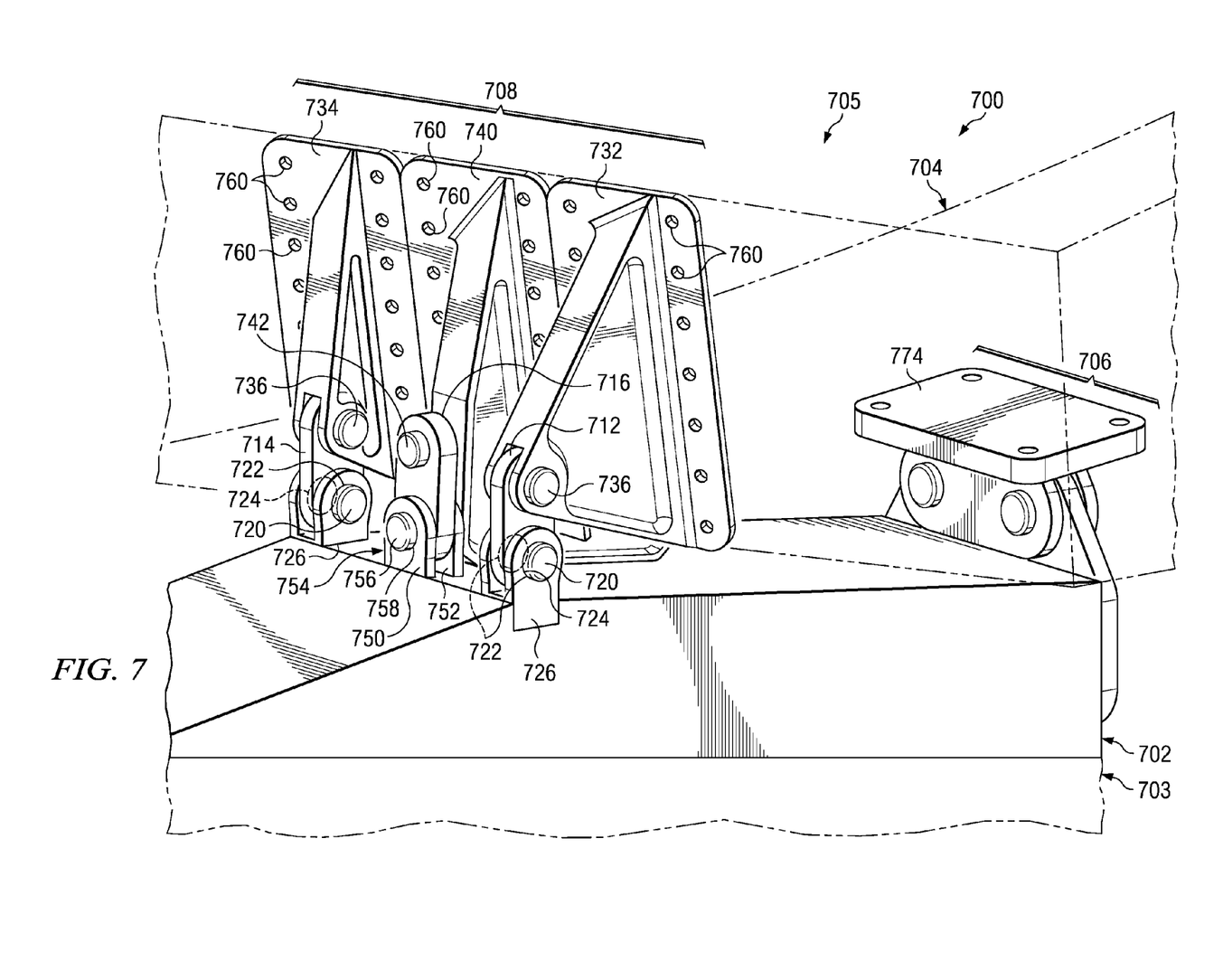
FIG. 7 is a diagram illustrating a side perspective view of a portion of an apparatus for mounting an aircraft engine to a wing of an aircraft in accordance with an advantageous embodiment.
Figure 8:
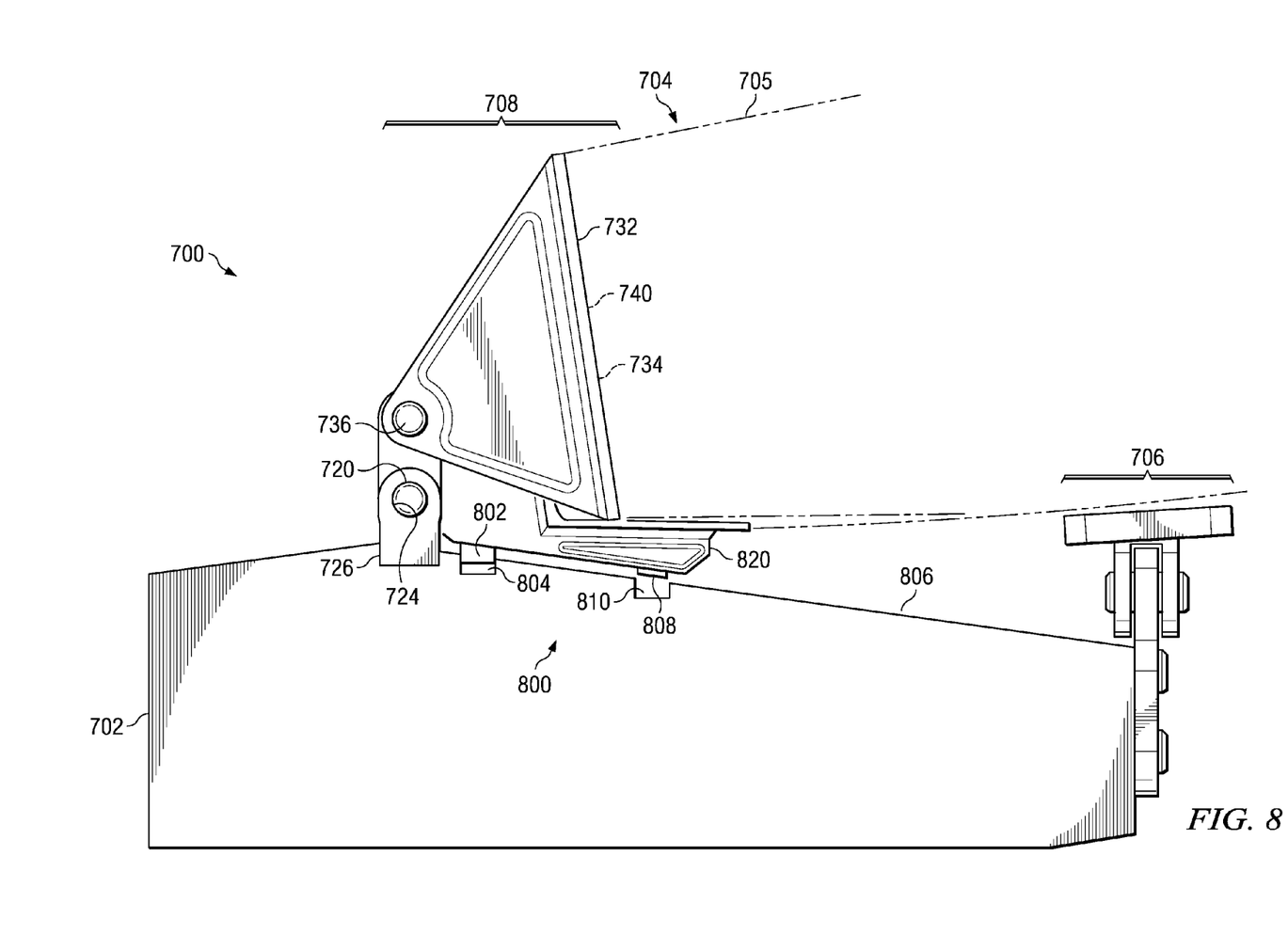
FIG. 8 is a diagram illustrating a side view of a portion of the mounting apparatus of FIG. 7.

FIG. 7 is a diagram illustrating a side perspective view of a portion of an apparatus for mounting an aircraft engine to a wing of an aircraft in accordance with an advantageous embodiment, and FIG. 8 is a diagram illustrating a side view of a portion of the mounting apparatus of FIG. 7. The mounting apparatus is generally designated by reference number 700 and includes a torque box strut 702, which may be an extended torque box strut, for supporting an aircraft engine, generally designated by reference number 703, and a plurality of strut-to-wing attachments, generally designated by reference number 704, for attaching the torque box strut to a wing of an aircraft schematically illustrated at 705.

Strut-to-wing attachments 704 generally include an aft mounting system 706 for mounting the torque box strut to the wing at an aft end of the strut, and a forward mounting system 708 for mounting the torque box strut to the wing at a position on the strut forward of aft mounting system 706.

Figure 9:
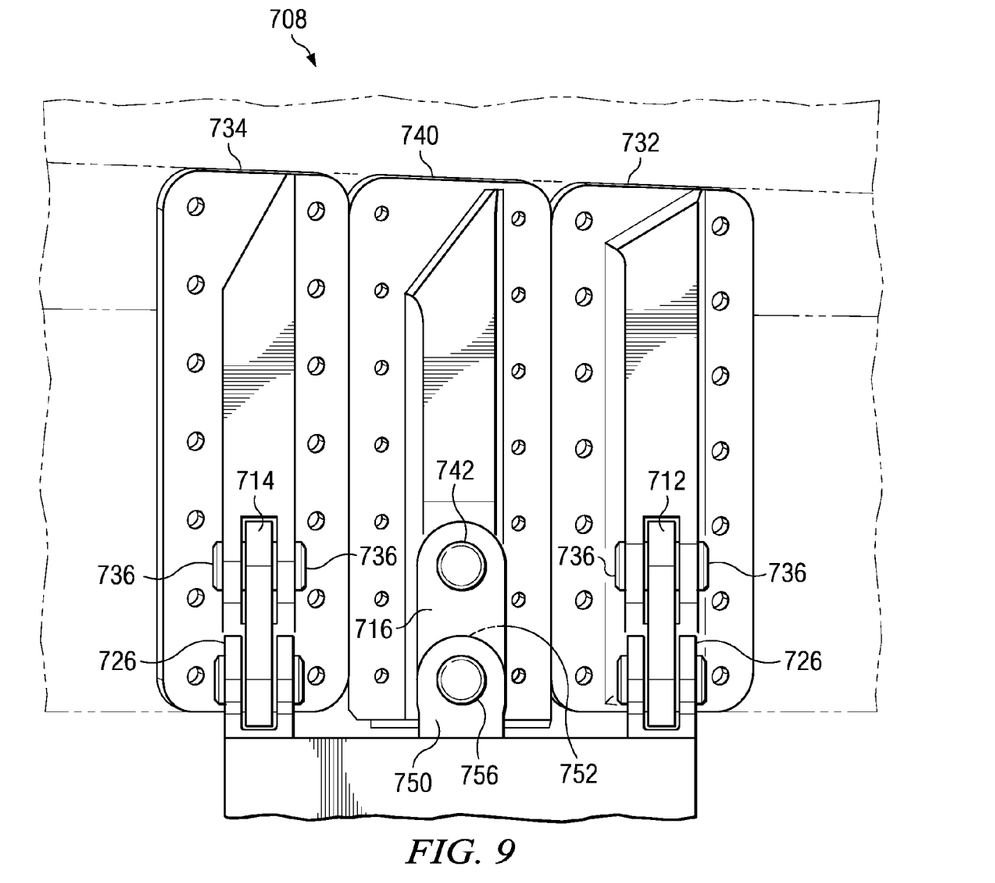
FIG. 9 is a diagram illustrating a front view of the forward mounting system of the mounting apparatus of FIGS. 7 and 8.

Forward mounting system 708 is illustrated in FIGS. 7 and 8, and is also illustrated in FIG. 9 which is a diagram illustrating a front view of the forward mounting system of the mounting apparatus of FIGS. 7 and 8.

Forward mounting system 708 has three vertical links 712, 714 and 716. Vertical links 712 and 714 are attached to torque box strut 702 by extending secondary pins 720 through aligned holes 722 and 724 at the lower end of the links and in vertical link fittings 726 attached to the strut, respectively. Vertical links 712 and 714 are attached to wing 704 via vertical mounting plates 732 and 734 attached to links 712 and 714 by fuse pins 736 extended through aligned holes at the upper ends of the links and in vertical mounting plates 732 and 734.

Vertical link 716 is between vertical links 712 and 714, and is oriented substantially perpendicular to vertical links 712 and 714. Vertical link 716 is attached to wing 704 via vertical mounting plate 740 attached to link 716 by pin 742 extended through aligned holes at the upper end of link 716 and in vertical mounting plate 740. Vertical mounting plates 732, 734 and 740 are attached to wing 704 by a plurality of fasteners (not shown) extended through holes 760 in the plates. Vertical link 716, however, is not attached to torque box strut 702. Instead, vertical link 716 is loosely positioned between vertical flanges 750 and 752 in a vertical link fitting 754 attached to torque box strut 702. Vertical link 716 carries a pin 756 that is generally aligned with holes 758 in flanges 750 and 752, but is not flush against the edges of the holes under normal flight conditions.

Vertical links 712 and 714 comprise active links during normal flight conditions in that they connect the torque box strut to the wing and support an engine attached to torque box strut 702. Vertical links 712 and 714 are effective in taking up vertical load between the engine and the wing, as well as any roll moment. Vertical link 716, on the other hand, is an inactive link during normal flight conditions in that it does not connect the torque box strut to the wing or support the engine or take up any load. If, however, either of vertical links 712 or 714 should fail, the failed link will move downwardly causing vertical link 716 to also move sufficiently to cause pin 756 carried by the link to engage holes 758 in flanges 750 and 752 of vertical link fitting 754 causing vertical link 716 to become attached to torque box strut 702. As a result, vertical link 716 functions as a "pin-in-hole" forward link catcher and becomes an active link and assists in supporting and taking up the engine load.

If one of vertical links 712 and 714 fails, vertical link 716, in effect, "catches" torque box strut 702 so that the engine attached to the strut will remain fully constrained in all six degrees of freedom. Vertical link 716, accordingly, is sometimes referred to herein as a "vertical" or "forward" catcher link. When it becomes active, vertical catcher link 716 is effective in taking up the vertical load as well as any roll moment normally taken up by the failed link.

Figure 10:
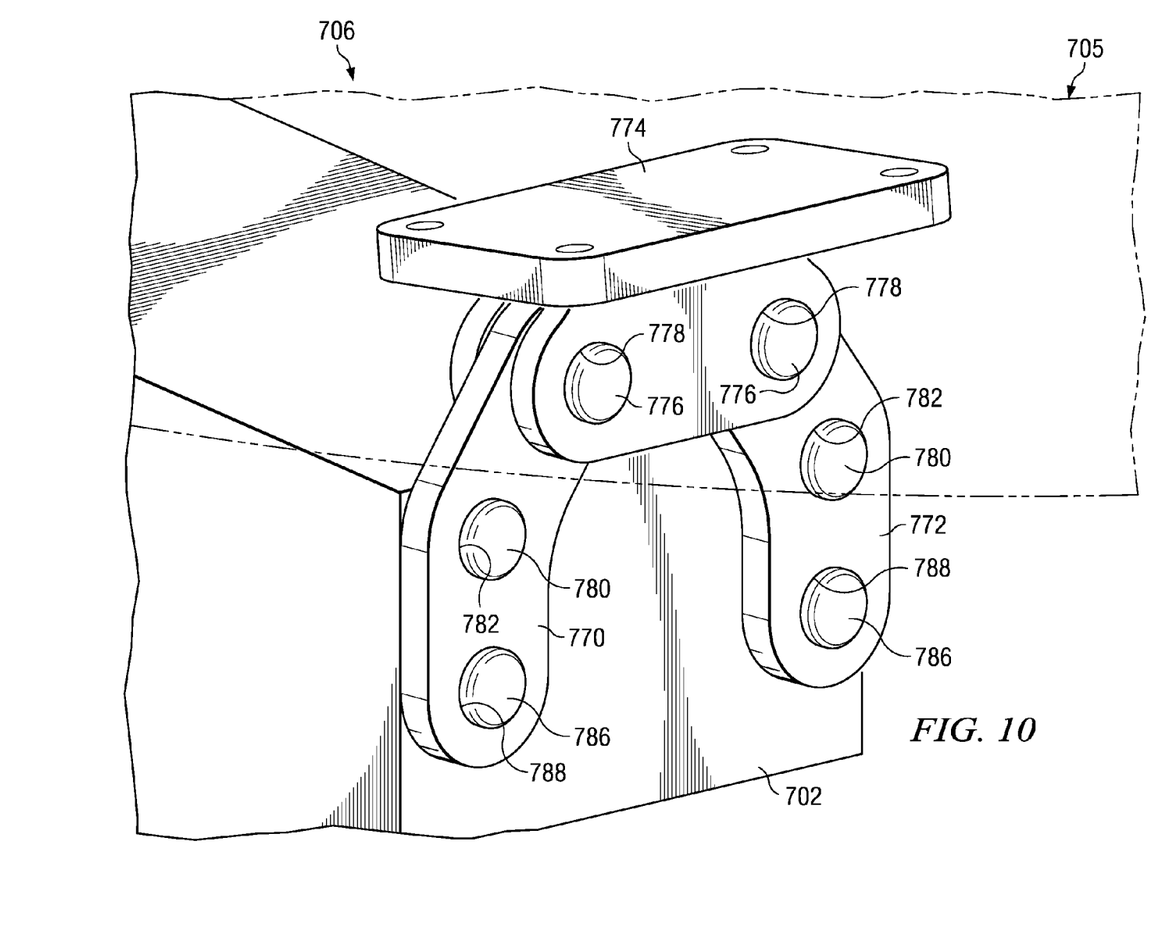
FIG. 10 is a diagram illustrating is a rear perspective view of the aft mounting system of the mounting apparatus of FIGS. 7 and 8.
Figure 11:
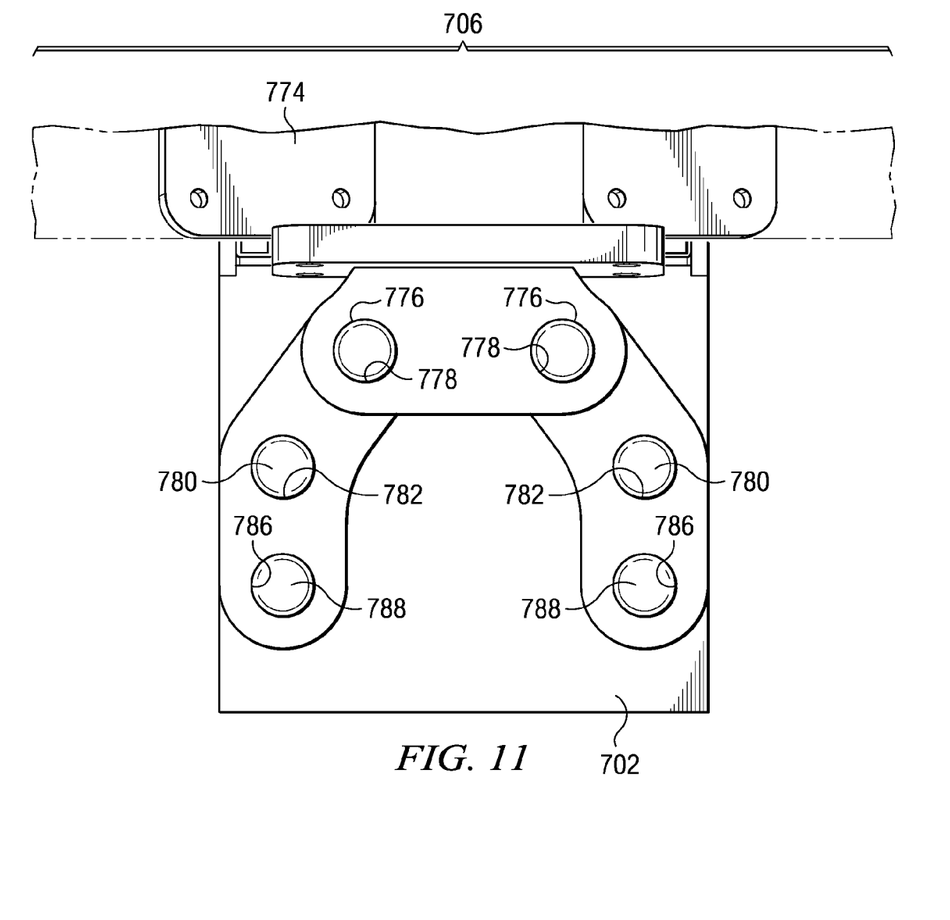
FIG. 11 is a diagram illustrating a rear view of the aft mounting system of FIG. 10.

Aft mounting system 706 is illustrated in FIGS. 7 and 8, and also in FIGS. 10 and 11. In particular, FIG. 10 is a diagram illustrating a rear perspective view of the aft mounting system of the mounting apparatus of FIGS. 7 and 8, and FIG. 11 is a diagram illustrating a rear view of the aft mounting system of FIG. 10.

Aft mounting system 706 includes a pair of aft links 770 and 772 for attaching torque box strut 702 to wing 705. More particularly, each aft link is attached to horizontal mounting plate 774 by extending a pin 776 through aligned holes in the links (holes 778) and in the horizontal mounting plate (not shown). In addition, each aft link 770 and 772 is attached to torque box strut 702 by extending pins 780 through aligned holes in the links (holes 782) and in the strut (not shown). Further, each aft link includes a third hole 786 and the strut box includes a pair of third pins 788.

During normal operation of the aircraft, pins 776 and 780 engage holes 776 and 782 in aft links 770 and 772 and form active aft links that take up both side load and vertical load. Third pins 788, however, are normally displaced from holes 786 in links 770 and 772 and, thus, are normally in an inactive condition in that they do not attach the torque box strut to the wing or support the engine. If, however, either of the active aft links should fail, the other aft link will rotate sufficiently for the third pin 788 to engage third hole 786 in the intact aft link resulting in that the intact link will begin to take the bending load and constrain the failed degree of freedom caused by the link failure. Thus, holes 786 in conjunction with the third pins 788 function as "pin-in-hole" aft link catchers" that are normally inactive but which becomes active in case of a link failure.

With reference to FIG. 8, a mounting apparatus according to advantageous embodiments also includes a thrust puck system for taking thrust and side load. The thrust puck system is illustrated in FIG. 8, and is generally designated by reference number 800. As shown in FIG. 8, the forward mounting system includes a base member 820 extending toward the aft end of torque box strut 702 from vertical mounting plate 736 attached to vertical catcher link 716. Base member 820 is bolted both vertically and horizontally to a wing hard point, either a spar or a rib. A cylindrical-shaped disk 802, referred to as a "thrust puck" extends downwardly from base member 820 and extends into a cylindrical-shaped recess 804 formed on the upper surface 806 of torque box strut 702. Thrust puck 802, by normally extending into recess 804 in strut 702 with an interference fit, is effective in taking up thrust and side load forces that are encountered during normal aircraft operation. Thrust puck 802, therefore, is active during normal aircraft operation.

If thrust puck 802 were to fail, however, a second thrust puck 808 is provided aft of thrust puck 802. More particularly, cylindrical-shaped thrust puck 808 extends downwardly from base member 820 and is aligned with a cylindrical-shaped recess 810 in the upper surface 806 of thrust box strut 702. Thrust puck 808, however, does not extend into recess 810 with an interference fit and is not load carrying in the normal state. Accordingly, thrust puck 808 is normally in an inactive state. If, however, thrust puck 802 should fail, strut 702 will move forward slightly to cause thrust puck 808 to engage recess 810 and become active and take up the thrust and side load forces normally taken up by thrust puck 802. Thrust puck 808, accordingly, functions as a "thrust puck catcher" upon failure of thrust puck 802.

The forward catcher, the aft catcher and the thrust puck catcher together provide a fail-safe apparatus for mounting an aircraft engine to a wing of an aircraft in that the engine will remain constrained in all six degrees of freedom notwithstanding a failure in one or more of the active forward links, aft links or thrust catcher.

Figure 12:
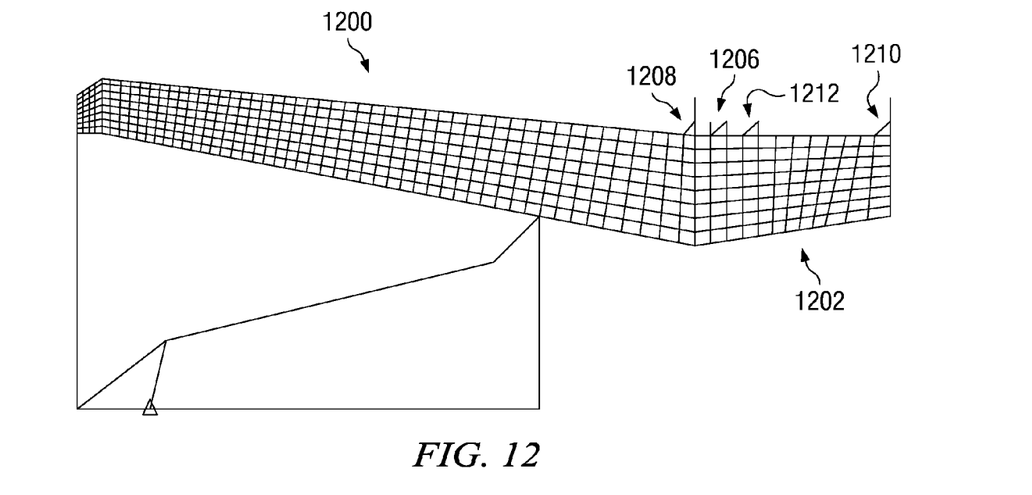
FIG. 12 is a diagram schematically illustrating an extended torque box strut in accordance with an advantageous embodiment.

Advantageous embodiments utilize an extended torque box strut. An extended torque box strut offers an increased moment arm for some of the loads to help reduce loads that are transmitted to the wing. FIG. 12 is a diagram schematically illustrating an extended torque box strut in accordance with an advantageous embodiment. The extended torque box strut is generally designated by reference number 1200 and may be implemented as torque box strut 702 in FIGS. 7-11. Extended torque box strut 1200 includes an extended aft portion 1202 that extends the aft end of the torque box strut beyond the conventional torque box strut. Arrow 1206 indicates the location where a conventional torque box strut, for example, torque box strut 410 in FIGS. 4-6, typically ends.

In the advantageous embodiment illustrated in FIGS. 7-11, vertical links 712, 714 and 716 of forward mounting system 708 are located quite near where the conventional torque box strut would end as shown by arrow 1208, while the aft links 770 and 772 of aft mounting system 706 are located at the extended aft end as shown by arrow 1210. Arrow 1212 indicates the locations of the thrust puck 802 and the catcher thrust puck 808 on the extended strut which are behind where the conventional thrust box strut would end.

An apparatus for mounting an aircraft engine to a wing of an aircraft utilizing an extended torque box strut in accordance with advantageous embodiments transmits lower interface loads to the wing, and is relatively easy to install due to the fact that it is statically determinant and does not require a preload. The torque box strut can also be made narrower because only two mounting points are needed at the aft end of the strut, and only three are needed at the forward mount.

Figure 13:
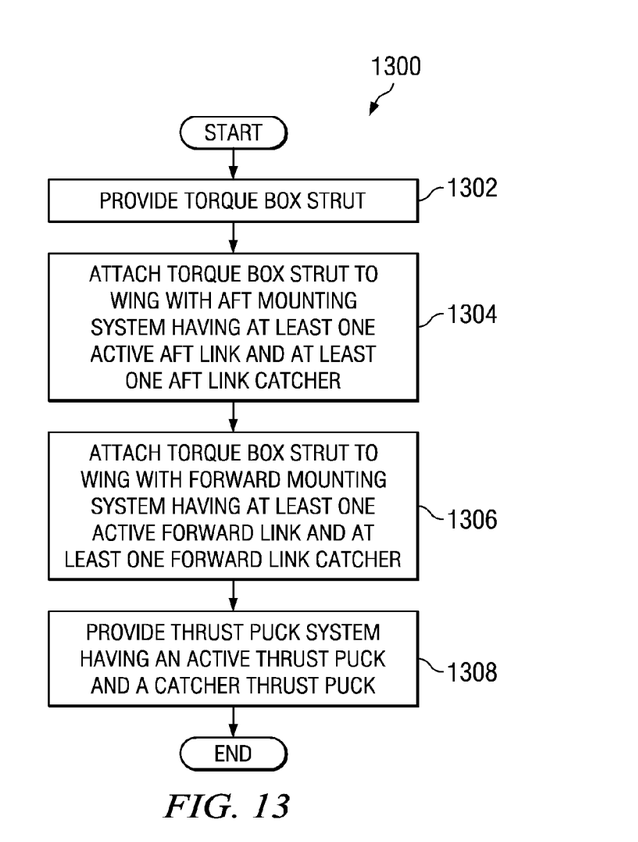
FIG. 13 is a flowchart that illustrates a method for mounting an aircraft engine to a wing of an aircraft in accordance with an advantageous embodiment.

FIG. 13 is a flowchart that illustrates a method for mounting an aircraft engine to a wing of an aircraft in accordance with an advantageous embodiment. The method is generally designated by reference number 1300, and begins by providing a torque box strut (Operation 1302). The torque box strut may be implemented as torque box strut 702 in FIGS. 7-11, may be attached to an aircraft engine to be mounted to a wing of an aircraft, and may be an extended torque box strut. An aft end of the torque box strut may be attached to a wing of an aircraft by an aft mounting system that may be implemented as aft mounting system 706 in FIGS. 7, 8, 10 and 11, that constrains side load and vertical load forces and that may comprise at least one active aft link for attaching the torque box strut to the wing during normal aircraft operation, and at least one aft link catcher for attaching the torque box strut to the wing upon a failure of one of the at least one active aft link (Operation 1304). The at least one aft link catcher does not attach the torque box strut to the wing during the normal aircraft operation.

The torque box strut may also be attached to the wing of the aircraft by a forward mounting system that is forward of the aft end, and that may be implemented as forward mounting system 708 in FIGS. 7, 8, and 9, that constrains vertical load forces and roll moment, and that may comprise at least one active forward link for attaching the torque box strut to the wing during normal aircraft operation, and at least one forward link catcher for attaching the torque box strut to the wing upon a failure of one of the at least one active forward link (Operation 1306). The at least one aft link catcher does not attach the torque box strut to the wing during the normal aircraft operation.

A thrust puck system may also be provided for constraining thrust and side load forces (Operation 1308). The thrust puck system may be implemented as thrust puck system 800 in FIG. 8, and may comprise an active thrust puck for constraining thrust and side load forces during normal aircraft operation, and a catcher thrust puck for constraining thrust and side load forces upon a failure of the active thrust puck. The catcher thrust puck is inactive during normal aircraft operation.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for mounting an aircraft engine to a wing of an aircraft, comprising:
    a torque box strut for supporting the aircraft engine; and
    a strut-to-wing mounting system for attaching the torque box strut to the wing of an aircraft, the strut-to-wing mounting system comprising:
        an aft mounting system for attaching the torque box strut to the wing, the aft mounting system comprising first and second active aft links for attaching the torque box strut to the wing during normal aircraft operation, first and second aft link catchers for attaching the torque box strut to the wing upon a failure of one of the first and second active aft links; and
        a forward mounting system for attaching the torque box strut to the wing, the forward mounting system comprising first and second active forward links for attaching the torque box strut to the wing during normal aircraft operation, and at least one forward link catcher for attaching the torque box strut to the wing upon a failure of one of the at least one active forward link, the forward link catcher positioned between the first and the second active forward links and oriented substantially perpendicular to the first and the second active forward links; and
        an active thrust puck for constraining thrust and side load forces during normal aircraft operation, and a catcher thrust puck for constraining thrust and side load forces upon a failure of the active thrust puck.

2. The apparatus according to claim 1, wherein the first and second active aft links attached to the torque box strut and to a wing mounting member during normal aircraft operation constrain side load and vertical load forces.

3. The apparatus according to claim 1, wherein the first and second aft link catchers each comprise a pin-in-hole aft link catcher.

4. The apparatus according to claim 1, wherein the first and second active forward links constrain vertical load forces and roll moment.

5. The apparatus according to claim 4, wherein the forward link catcher comprises a pin-in-hole forward link catcher.

6. The apparatus according to claim 4, wherein the first and second active forward links and the forward link catcher comprise vertical links.

7. The apparatus according to claim 1, wherein the aft link catcher and the forward link catcher do not attach the torque box strut to the wing during the normal aircraft operation.

8. The apparatus according to claim 1, wherein the active thrust puck comprises a substantially cylindrical-shaped active thrust puck on the forward mounting system for extending into a first substantially cylindrical-shaped recess in the torque box strut during the normal aircraft operation, and wherein the catcher thrust puck comprises a substantially cylindrical-shaped catcher thrust puck on the forward mounting system for extending into a substantially second cylindrical-shaped recess in the torque box strut upon a failure of the active thrust puck.

9. The apparatus according to claim 1, wherein the catcher thrust puck is inactive during the normal aircraft operation.

10. The apparatus according to claim 1, wherein the torque box strut comprises an extended torque box strut.

11. A method for mounting an aircraft engine to a wing of an aircraft, wherein the aircraft engine is supported by a torque box strut, and wherein the torque box strut is attached to the wing of the aircraft, the method comprising:
    attaching the torque box strut to the wing by a first and a second active aft links during normal aircraft operation, and attaching the torque box strut to the wing by a first and a second aft link catchers upon a failure of one of the at least one active aft link;
    attaching the torque box strut to the wing by a first and a second active forward links during normal aircraft operation, and attaching the torque box strut to the wing by at least one forward link catcher upon a failure of the at least one active forward link, the forward link catcher positioned between the first and the second active forward links and oriented substantially perpendicular to the first and the second active forward links; and
    providing an active thrust puck for constraining thrust and side load forces during normal aircraft operation, and providing a catcher thrust puck for constraining the thrust and side load forces upon a failure of the active thrust puck.

12. The method according to claim 11, wherein
    the first and the second active aft links constrain side load and vertical load forces during the normal aircraft operation, and the first and the second aft link catchers constrain the side load and the vertical load forces upon the failure of one of the at least one active aft link; and
    the first and the second active forward links constrain vertical load forces and roll moment during the normal aircraft operation.

13. The method according to claim 11, wherein the first and the second aft link catchers and the forward link catcher do not attach the torque box strut to the wing during the normal aircraft operation, and wherein the catcher thrust puck is inactive during the normal aircraft operation.

14. The method according to claim 11, wherein the first aft link catcher attaches the torque box strut to the wing upon a failure of the first active aft link, and wherein the second aft link catcher attaches the torque box strut to the wing upon a failure of the second active aft link.

15. The method according to claim 11, wherein the forward link catcher attaches the torque box strut to the wing upon a failure of either of the first or second active forward links.

16. Apparatus for mounting an aircraft engine to a wing of an aircraft, comprising:
- a torque box strut for supporting the aircraft engine; and
- a strut-to-wing mounting system for attaching the torque box strut to the wing of an aircraft, the strut-to-wing mounting system comprising:
    - an aft mounting system for attaching the torque box strut to the wing at an aft end of the strut, the aft mounting system comprising first and second active aft links for attaching the torque box strut to the wing to constrain side and vertical load forces during normal aircraft operation, and first and second aft link catchers for attaching the torque box strut to the wing to constrain the side and vertical load forces upon a failure of one of the first and second active aft links, the first and second aft link catchers not attaching the torque box strut to the wing during the normal aircraft operation;
    - a forward mounting system for attaching the torque box strut to the wing at a position on the strut that is forward of the aft end, the forward mounting system comprising first and second active forward links for attaching the torque box strut to the wing for constraining vertical load forces and roll moment during the normal aircraft operation, and a forward link catcher for attaching the torque box strut to the wing upon a failure of either the first or the second active forward link for constraining the vertical load forces and the roll moment, the forward link catcher not attaching the torque box strut to the wing during the normal aircraft operation, and the forward link catcher positioned between the first and the second active forward links and oriented substantially perpendicular to the first and the second active forward links; and
    - a thrust puck system, the thrust puck system comprising an active thrust puck for constraining thrust and side load forces during normal aircraft operation, and a catcher thrust puck for constraining the thrust and side load forces upon a failure of the active thrust puck, the catcher thrust puck being inactive during the normal aircraft operation.

17. The apparatus according to claim 16, wherein the first and second aft link catchers each comprise a pin-in-hole aft link catcher.

18. The apparatus according to claim 16, wherein the forward link catcher comprises a pin-in-hole forward link catcher.

19. The apparatus according to claim 16, wherein the first and second active forward links and the forward link catcher comprise vertical links.

20. The apparatus according to claim 16, wherein the active thrust puck comprises a cylindrical-shaped active thrust puck on the forward mounting system for extending into a first cylindrical-shaped recess in the torque box strut during the normal aircraft operation, and wherein the catcher thrust puck comprises a cylindrical-shaped catcher thrust puck on the forward mounting system for extending into a second cylindrical-shaped recess in the torque box strut upon a failure of the active thrust puck.

21. The apparatus according to claim 16, wherein the torque box strut comprises an extended torque box strut.

\* \* \* \* \*